United States Patent [19]

Shear, III et al.

[11] Patent Number: 5,388,475
[45] Date of Patent: Feb. 14, 1995

[54] BALL NUT AND METHOD OF MANUFACTURING SAME

[75] Inventors: Walter J. Shear, III, Waterford; Theodore R. Schlenker, Troy, both of Mich.

[73] Assignee: Beaver Precision Products, Troy, Mich.

[21] Appl. No.: 121,700

[22] Filed: Sep. 15, 1993

[51] Int. Cl.⁶ .................... F16H 25/22; F16H 25/24; B29D 1/00
[52] U.S. Cl. .................... 74/459; 264/267; 264/318
[58] Field of Search .................... 74/459; 264/267, 318

[56] References Cited

U.S. PATENT DOCUMENTS

| | | |
|---|---|---|
| 3,059,494 | 1/1962 | Grabowski et al. . |
| 3,277,736 | 10/1966 | Goodman . |
| 3,313,873 | 4/1967 | Dembiak . |
| 3,327,551 | 6/1967 | Prueter . |
| 3,656,358 | 4/1972 | Kopp . |
| 3,673,817 | 7/1972 | Doran et al. . |
| 3,975,968 | 8/1976 | Chaffin . |
| 4,074,587 | 2/1978 | Brusasco . |
| 4,138,902 | 2/1979 | Brusasco . |
| 4,258,584 | 3/1981 | Haegele et al. . |
| 4,272,476 | 6/1981 | Benton . |
| 4,342,235 | 8/1982 | Benton . |
| 4,564,993 | 1/1986 | Blaurock et al. . |
| 4,638,548 | 1/1987 | Miller . |
| 4,643,011 | 2/1987 | Wossner et al. . |
| 4,643,041 | 2/1987 | Benton . |
| 4,760,635 | 8/1988 | Miller . |
| 4,790,971 | 12/1988 | Brown et al. . |
| 4,859,394 | 8/1989 | Benton et al. . |
| 4,896,552 | 1/1990 | Virga . |
| 4,905,533 | 3/1990 | Benton et al. . |
| 4,905,534 | 3/1990 | Andonegui . |
| 4,924,722 | 5/1990 | Bacardit et al. . |
| 4,938,090 | 7/1990 | Brusasco . |
| 4,945,781 | 8/1990 | Isert . |
| 4,953,419 | 9/1990 | Schlenker . |
| 4,981,459 | 1/1991 | Klinkenberg . |
| 5,014,568 | 5/1991 | Schlenker . |
| 5,056,211 | 10/1991 | Hauser . |
| 5,069,088 | 12/1991 | Tanaka . |

*Primary Examiner*—Allan D. Herrmann
*Attorney, Agent, or Firm*—Brooks & Kushman

[57] ABSTRACT

A ball nut for use in combination with a ball screw and a plurality of ball bearings wherein said ball nut has a metallic sleeve segment including a longitudinal opening and a plurality of equidistant arcuate grooves. A polymeric deflector segment is included, having a plurality of S-shaped return grooves spaced apart sufficiently to cooperate with the plurality of arcuate grooves of the sleeve segment for completing a plurality of bearing race circuits inside the ball nut. A polymeric ball nut body encases the sleeve segment including a longitudinal slot for receiving the deflector segment sufficiently to place the plurality of equal distant arcuate grooves into cooperation relationship with the S-shaped return grooves.

14 Claims, 3 Drawing Sheets

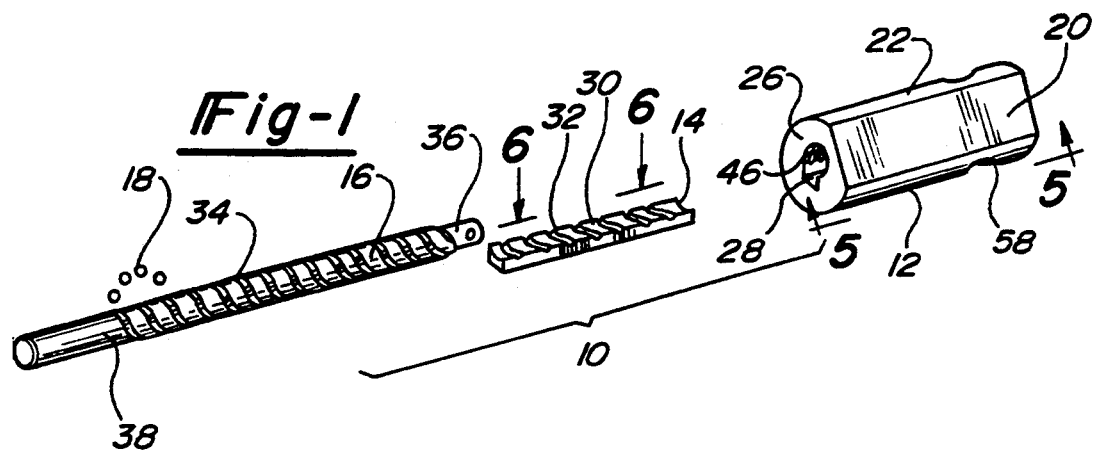
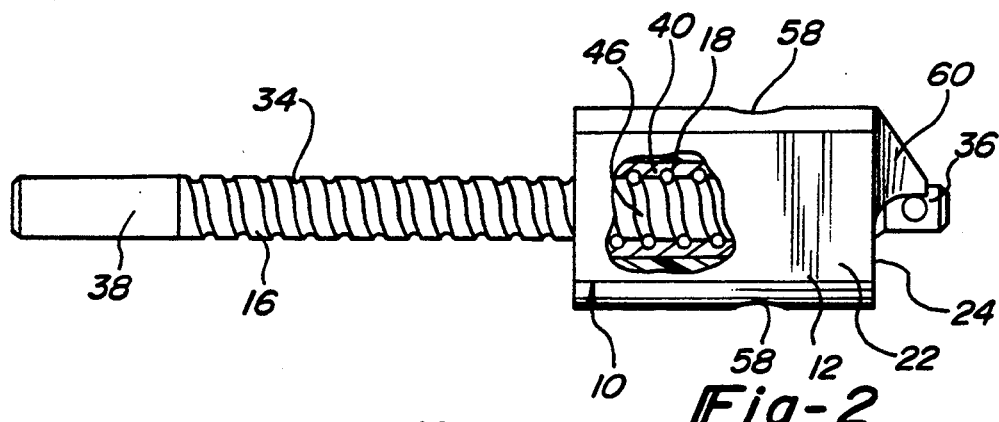
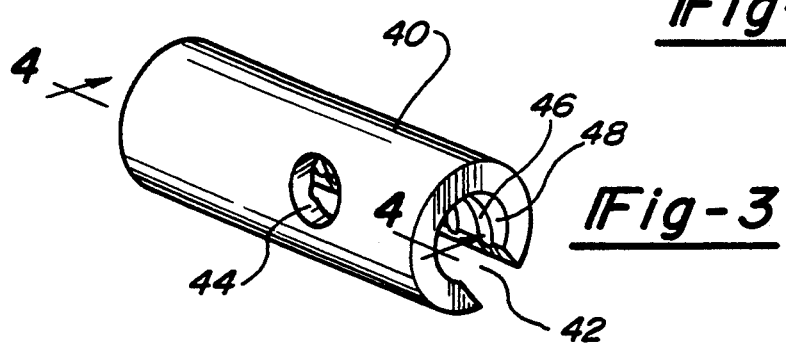
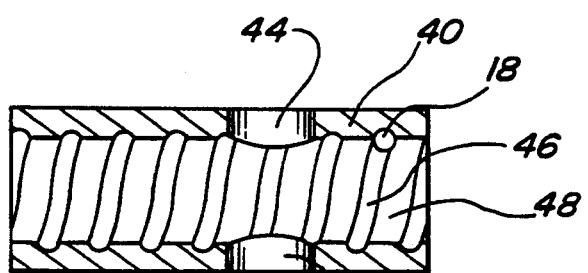

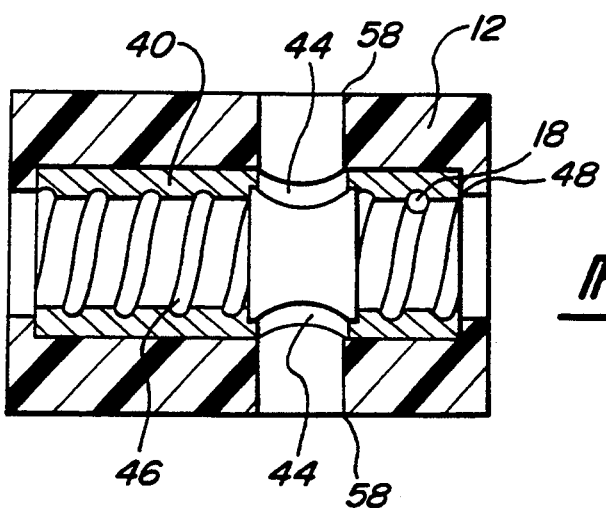
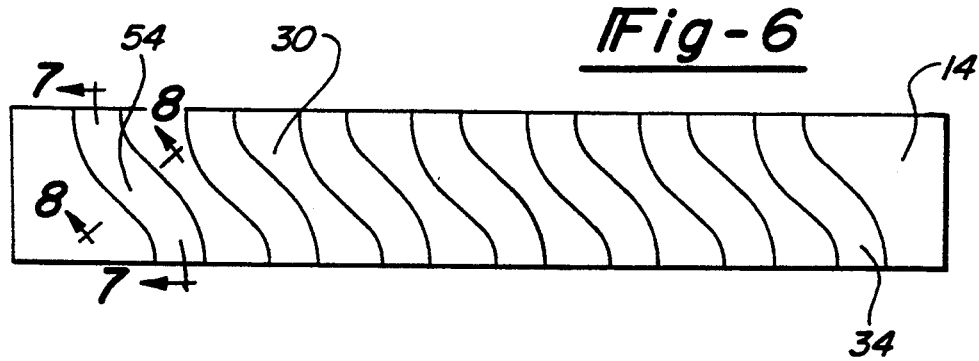
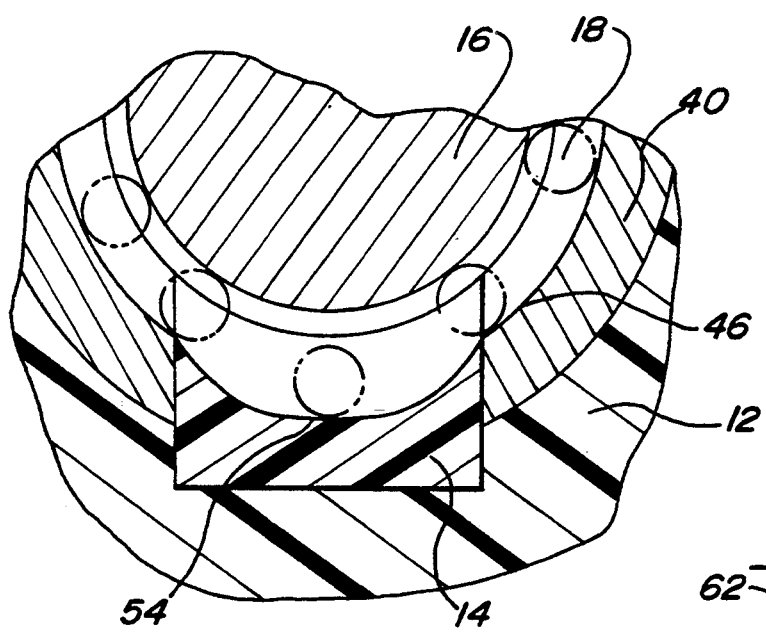
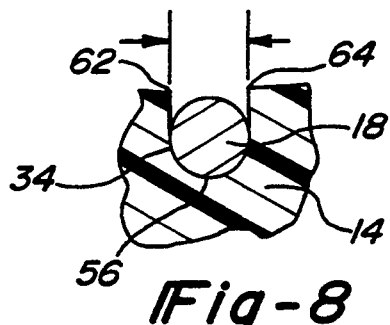

BALL NUT AND METHOD OF MANUFACTURING SAME

TECHNICAL FIELD

This invention relates to ball screw assemblies for translating rotary motion to linear motion or vice-versa and, more particularly, to a light-weight ball nut manufactured from a polymeric material including a metallic inner sleeve and a method of making same.

BACKGROUND ART

Ball screw assemblies are commonly utilized to translate rotary motion to linear motion or vice-versa. Most ball screw assemblies include an elongate ball screw, and a ball nut body. The ball nut body in cooperation with the ball screw direct a plurality of ball bearings through an internal bearing race formed between the ball nut body and ball screw upon rotation of the ball screw. The ball bearings translate rotary motion of the ball screw to linear motion of the ball nut body. Both the elongate ball screw and ball nut body commonly include a continuous helical groove which defines the internal bearing race.

As is known in the prior art, continuous contact between the ball bearings and that portion of the ball screw forming the bearing race causes significant wear of those parts over time. It is known that the components comprising the bearing race thus must be made from materials that have strength values capable of handling high stresses. Definitive relationships must be maintained between the helical grooves that recirculate the balls through the ball nut body. These relationships are maintained through precision machining and forming operations applicable to the particular high strength material chosen. The materials commonly used in the prior art for manufacturing these components include various metals, typically steel.

Entire ball nut bodies are commonly manufactured from steel and grooves are machined within the ball nut body. Similarly, the elongate ball screw is commonly manufactured from steel including matching helical grooves. The best known methods of manufacturing steel nut bodies incorporating an internal helical groove result in relatively heavy ball nut bodies which are expensive to manufacture. These single piece or unitary ball nut bodies are normally produced by mechanical chip-forming machining starting from a block of steel.

In continuously recirculating ball nut assemblies, either an inner or separate outer ball return or recirculation system must be included to allow the balls to translate properly. Manufacturing processes for forming these recirculation devices on steel nut bodies are generally very expensive. The use of steel ball nut assemblies of the single piece type are thus substantially limited to extremely sophisticated applications in which the need to obtain maximum operational precision and minimum friction outweigh the cost of manufacturing.

U.S. Pat. No. 4,945,781 to Isert discloses a prior art solution to extensive matching of single piece steel ball nut bodies. Isert discloses a ball screw mechanism comprising an elongate cuboid block with gripping jaws for retaining a recirculator. The recirculator has S-shaped, curved, transition grooves for returning the plurality of balls that circulate within the nut, by one flight each on the ball screw. The recirculator is clamped in place between jaws defined on the ball nut body. The ball screw mechanism of Isert thus discloses a ball screw assembly which does not require intricate machining or assembly of an inner or outer ball return system, but is still relatively heavy and inefficient for some applications.

U.S. Pat. No. 3,327,551 to Prueter discloses a ball return means for a ball nut assembly. The ball return mean comprises a ball return tube molded in place inside a rectangular crossover block or guide element. The guide element is made separately from the ball nut member and is free to slide in a longitudinal groove within an internal wall of the ball nut member. The return tube is preferably made of steel and the guide element is preferably made of a bearing grade plastic. As with the Isert reference disclosed above, the Prueter reference discloses a ball nut body which is made of steel and is relatively heavy. Prueter also includes numerous machining and molding steps which would increase the expense of manufacturing such a ball nut.

As stated previously, weight considerations are a factor in choosing a ball nut assembly for use in a particular application. It is known in the aircraft design and defense missile industries, that individual component weight is very important in choosing a component for a particular application. This weight reduction cannot come at the expense of durability, accuracy and increased friction. Thus, it is highly desirable to replace heavy metallic parts with formed polymeric parts if at all possible without a loss in strength and accuracy.

U.S. Pat. No. 4,074,587 to Brusasco discloses a screw-nut transmission coupling utilizing a hardened steel first sleeve having a helical groove defined thereon and a second sleeve formed by direct molding a reinforced plastic or sintered steel onto the first sleeve. The Brusasco reference discloses an internal ball recirculation system utilizing a substantial U-shaped recirculation path formed in the outer surface of the second sleeve. A third metallic sleeve acts as a closing cover for the ball return channel and is mounted on the second sleeve after introducing through the channel a sufficient plurality of balls to completely fill the paths.

DISCLOSURE OF THE INVENTION

The present invention provides a ball nut for use in combination with a ball screw and a plurality of ball bearings comprising a partially circumambient sleeve, a deflector segment having an integral ball return system, and a polymeric ball nut body encasing the sleeve and deflector. The partially circumambient sleeve includes a longitudinal opening on one side and an inner surface portion having a plurality of equidistant arcuate grooves defined thereon. The deflector segment includes a surface portion which is cooperable with the surface portion of the partially circumambient sleeve for completing the circumambience of the sleeve segment around the ball screw. The deflector surface has a plurality of S-shaped return grooves defined thereon spaced apart sufficiently to cooperate with the arcuate grooves of the circumambient sleeve and the ball screw to complete a plurality of internal, closed bearing race circuits. The S-shaped return grooves return the ball bearings during circulation to a preceding segment of an arcuate groove.

The ball nut body of the present invention encases the sleeve segment and includes a longitudinal slot for receiving the deflector segment. The deflector segment is engaged with the sleeve segment sufficiently to place the equidistant arcuate grooves into cooperating relationship with the S-shaped return grooves of the deflector.

The present invention further provides a method of manufacturing a ball nut comprising the steps of locating a sleeve segment on a fixturing post in a mold while cooperatively engaging a locating notch disposed on the fixturing post with a longitudinal opening of the sleeve segment, sliding the sleeve segment onto the fixturing post, pressing a second injection mold portion onto the first injection mold portion to form a sealed mold cavity, injecting a thermosetting polymeric material into the sealed mold cavity around the sleeve segment to completely encase the sleeve segment, cooling the thermoplastic material to form a ball nut body and ejecting the ball nut body from the first injection mold portion.

It is an object of the present invention to provide an inexpensive, light-weight ball nut that incorporates the use of a polymeric material molded around a metallic sleeve segment providing strength characteristics that ensure the functional integrity of the ball nut assembly in operation.

It is another object of the present invention to provide a light-weight ball nut wherein the weight reduction is achieved by using a carbon reinforced nylon in place of conventional carbon steel in the body of the ball nut.

It is yet another object of the present invention to provide a ball screw assembly system which reduces radial and axial backlash by utilizing a stainless steel sleeve segment in combination with a stainless steel screw to form an internal bearing race.

It is still yet another object of the present invention to provide a low cost ball nut which eliminates numerous machining operations attached with manufactured ball recirculation systems utilizing inner and outer ball return paths by molding the ball nut body around the sleeve segment and utilizing an integral ball return system defined within a deflector.

It is a further object of the present invention to provide a ball nut body wherein the deflector incorporating the ball recirculation system is molded simultaneously with the ball nut body.

It is a still further object of the present invention to provide an inexpensive method of manufacturing a ball nut by injection molding a polymeric carbon reinforced composition around a stainless steel sleeve segment to form a light-weight ball nut body.

BRIEF DESCRIPTION OF THE DRAWINGS

FIG. 1 is an exploded perspective view of a ball nut and ball screw of the present invention;

FIG. 2 is a partially fragmented side view of a ball nut and ball screw of the present invention;

FIG. 3 is a perspective view of a sleeve segment of the present invention;

FIG. 4 is a cross-sectioned view of a sleeve segment of the present invention taken along lines 4—4 of FIG. 3;

FIG. 5 is a cross-sectional view of the ball nut of the present invention taken along lines 5—5 of FIG. 1;

FIG. 6 is a top view of the deflector segment of the present invention viewing along lines 6—6 of FIG. 1;

FIG. 7 is a cross-sectional view of a return groove of the present invention taken along lines 7—7 of FIG. 6 including depiction of the ball nut body, plurality of ball bearings and elongate ball screw;

FIG. 8 is a cross-sectional view of the transfer path of the present invention taken along lines 8—8 of FIG. 6;

BEST MODE FOR CARRYING OUT THE INVENTION

Figure 9:
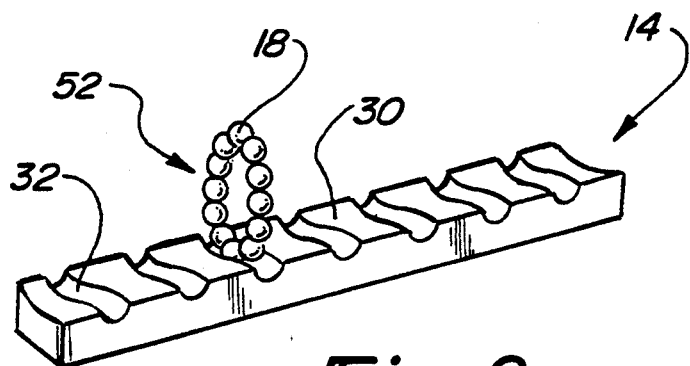
FIG. 9 is a perspective view of a deflector and a plurality of ball bearings of the present invention.

Referring to FIGS. 1 and 2, a ball nut assembly 10 is shown generally by the reference numeral 10 in FIGS. 1 and 2. Ball nut assembly 10 includes a ball nut body 12, a deflector 14, a ball screw 16, and ball bearings 18. Ball nut 12 includes a substantially planar surface 20, a semi-cylindrical surface 22, a top surface 24 and a bottom surface 26. The ball nut body further includes an elongate slot 28.

As shown in FIG. 1, deflector 14, also known as a multiliner in the art, is configured to be received within elongate slot 28 of ball nut body 12. Deflector 14 includes a surface portion 30 and a plurality of S-shaped grooves 32 defined on surface 30. Ball screw 16 includes a continuous helical groove 34, which extends from a first end 36 of ball screw 34 to second end 38.

As illustrated in FIGS. 3 and 4, a sleeve segment 40 is shown having a longitudinal opening 42 and a pair of connecting apertures 44. With specific reference to FIG. 4, sleeve segment 40 includes a plurality of equidistant arcuate grooves 46 defined on an inner surface 48. The pitch of continuous helical groove 34 disposed on ball screw 16 is identical to the pitch of the plurality of equidistant arcuate grooves 46 disposed on inner surface 48 of sleeve segment 40.

As discussed previously, unitary ball nuts of the prior art were often manufactured from solid steel blocks and formed to particular shapes depending upon the application the ball screw assembly was being used for. In addition, a center bore was drilled through the nut body and a helical groove was machined within that bore to provide one-half of an internal bearing race. Steel was often used because of its high strength and low friction characteristics when combined with similar steel ball bearings and a steel ball screw.

The present invention contemplates the use of a metallic sleeve segment 40 encased within a light-weight plastic ball nut body. The preferred embodiment of the present invention contemplates use of a precipitation-hardening steel alloy such as 17-4 stainless steel. With utilization of precipitation hardening alloys, final machining operations can be performed before heat treatment if allowance is made for slight growths in the material. Precipitation hardening alloys such as 17-4 stainless steel are the preferred metal because of its high strength-weight ratio and strength at elevated temperatures.

As can be seen from FIGS. 2 and 5, sleeve segment 40 is entirely encased within ball nut body 12. Ball nut body 12 is preferably a fiber reinforced polymeric material. The preferred embodiment of the present invention contemplates use of a ball nut body comprised of 45–50% nylon 6/6, 10–20% polytetrafluoroethylene (Teflon) and 25–30% carbon fiber reinforcement. The base structure of the ball nut body is comprised mainly of nylon for structure, with Teflon added as a lubricant and the carbon fiber added as a reinforcement material. This composition affords very low shrinkage in a wide variety of temperatures, i.e. shrinkage of between 0.0015 to 0.0025 per inch at temperatures of between −60′ and 150′ Fahrenheit. The particular composition provides high strength, increased surface hardness, stiffness and lower creep than a ball nut body manufactured from solely nylon 6/6.

Deflector segment 14, as illustrated in FIGS. 1, 6 and 7, is configured to be received within slot 28 of ball nut 12. Inner surface 30 of deflector segment 14 completes the inner cylindrical shape of sleeve segment 40 upon insertion within ball nut body 12. Deflector segment 14 incorporates the ball return system of the ball nut assembly.

It is known in the art that ball recirculation systems may be included as integral return systems manufactured or machined directly into the internal bearing race circuits as disclosed in U.S. Pat. No. 3,327,551 to Prueter discussed above. An alternative ball return system is disclosed in U.S. Pat. No. 4,945,781 to Isert wherein separate ball bearing circuits are created through insertion of a separate segment which redirects the ball bearings traveling through the circuit to a preceding helical groove.

As shown in FIG. 6, the present invention utilizes a deflector segment having a plurality of S-shaped grooves defined upon surface 30 of deflector 14. These S-shaped return grooves are spaced sufficiently apart to cooperate with the plurality of arcuate grooves defined on sleeve segment 40 and continuous helical groove 34 of ball screw 16. Thus, when deflector segment 14 is sufficiently received within ball nut body 50, a plurality of individual bearing race circuits are created. Translational movement of the plurality of ball bearings is maintained by the individual S-shaped groove 32 returning ball bearings to a preceding segment of an arcuate groove. As disclosed in FIG. 9, each plurality of ball bearings thus translates through individual bearing race circuits 52.

As can be seen from FIGS. 7 and 8, S-shaped return grooves 34 include an intermediate transfer channel 54 which is disposed within S-shaped groove 32. Intermediate transfer channel 54 has a continuous central arcuate wall 56 which is disposed below surface 30 of deflector 14 far enough to allow ball bearings 18 to fit completely within intermediate transfer channel 54. As illustrated in FIG. 7, the path of the plurality of ball bearings 18 is deflected from its continuous helical paths around ball screw 16 within the internal bearing race formed within the ball nut. This deflection is illustrated in FIG. 7 as ball bearings 18 travel into S-shaped return groove 32 and subsequently into intermediate transfer channel 54. Thus, the depth of intermediate transfer channel 54 must be such that ball bearings 18 are removed from contact with ball screw 16 momentarily to allow redirection of the ball 18 to the subsequent portion of preceding arcuate groove 46.

Deflector 14 is manufactured from plastic or some other polymeric material. The preferred embodiment of the present invention utilizes a deflector segment comprised of 60-70% nylon, 10-16% polytetrafluoroethylene (teflon), 1-4% silicone and 25-30% fiber reinforcement. Similar to the material of the ball nut body described above, the preferred embodiment would use nylon 6/6 and carbon fibers as the carbon reinforcement material. As described above, nylon 6/6 would provide the structure for the deflector with polytetrafluoroethylene as a lubricant, carbon fiber as a reinforcement and 2% silicone added as a surface lubricant. This surface lubricant is required because the deflector segment S-shaped return grooves 32 have constant direct contact with translating ball bearings 18 in operation.

Deflector segment 14 may be molded in the same operation simultaneously with the ball nut body 12 or may molded in a different forming operation. The S-shaped grooves 32 are either molded directly onto the deflector 14 or machined onto deflector 14 in later manufacturing operations.

Figure 10:
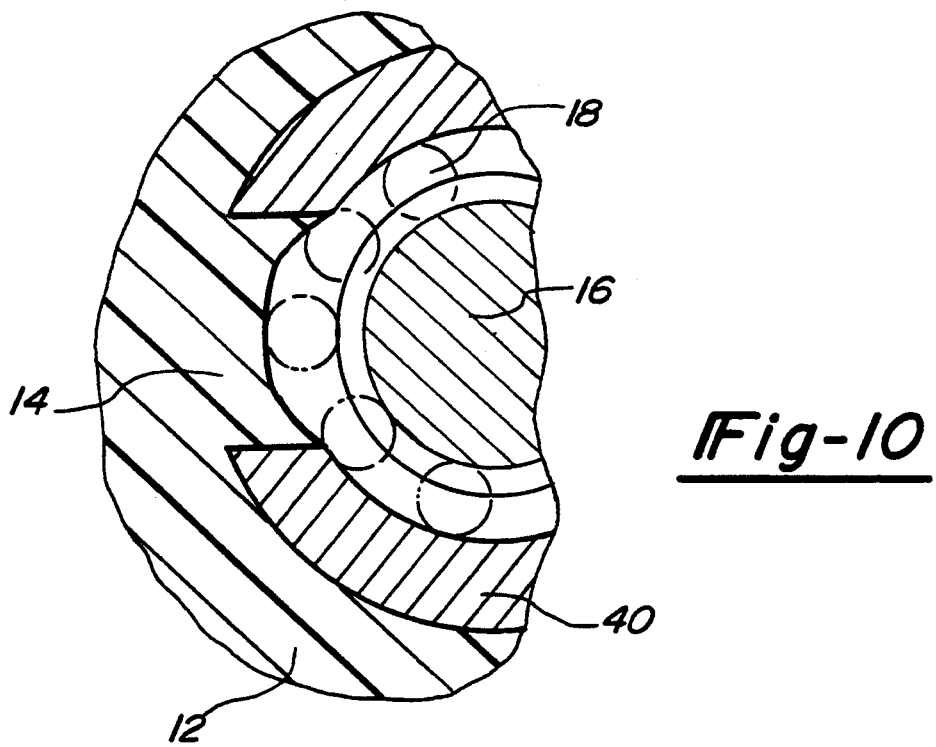
FIG. 10 is a cross-sectional view of an alternate embodiment of the present invention illustrating an integrally molded deflector.

An alternative embodiment of the present invention shown in FIG. 10 illustrates a deflector 14 which is integrally molded within the ball nut body 12 as a one-piece construction. Molding deflector 14 within ball nut body 12 may be accomplished by a removable locating notch. A removable locating notch system allows removal of the ball nut body without splitting or severing. In this system, the ball nut body would be molded upon a fixturing post including a removable locating notch. The removable locating notch is affixable to the fixturing post by a dovetail cooperating connection. The locating notch includes an outer portion having a surface configured to provide cooperating equidistant arcuate grooves upon molding.

After molding, the ball nut body and attached locating notch are removed from the fixturing post. The locating notch is then removed leaving molded arcuate grooves with the ball nut body. The locating notch is then reattached to the fixturing post by use of the dovetail connection and an additional ball nut body may be molded.

Sleeve segment 40 is entirely encased within ball nut body 12. Expansion and contraction of the ball nut body polymeric material due to extreme temperature variances may affect operation of the internal bearing circuits. Specifically, extreme cold temperatures may cause sufficient contraction of the ball nut body polymeric material around sleeve segment 40 to affect a slight contraction of the sleeve segment around its central axis. Due to the arcuate nature of the plurality of grooves 46 defined on sleeve segment 40, misalignment of the arcuate grooves 46 with return grooves 34 of deflector segment 14 may occur. To compensate for this misalignment, the present invention utilizes a slightly smaller ball bearing diameter than that which may be commonly utilized for the size of the particular arcuate grooves 46 or "S" shaped return grooves 34.

As disclosed in FIG. 8, intermediate transfer channels 54 include a first edge 62 and a second edge 64. The distance across first edge 62 to second edge 64 defines a distance substantially equal to the width of intermediate transfer channel 54 and the other portions of S-shaped return grooves 34. The present invention contemplates the distance across first edge 62 and second edge 64 as three to eight percent greater than the diameter of each of the plurality of ball bearings used. This ratio between the diameter of the ball bearings and the width of the S-shaped return grooves 34 of deflector 14 provides sufficient tolerance between the ball bearing and transfer groove to compensate for any expansion or contraction of the polymeric materials of the ball nut body.

In operation, the ball nut of the present invention translates rotary motion to linear motion or vice-versa. In translating rotary motion to linear motion, ball screw 16 is rotated, thereby translating motion to the plurality of ball bearings disposed within the ball nut body between sleeve segment 40, deflector segment 14 and ball screw 16. Thus, in combination; ball screw 16 and sleeve segment 40 in conjunction with deflector 14 provide an inner bearing race for the plurality of ball bearings to travel. As ball screw 16 is rotated, ball bearings 18 are thrust into motion thereby applying force in a linear direction to sleeve segment 40.

Sleeve segment 40 includes a pair of connecting apertures 44. Ball nut body 12 includes a pair of trunion holes 58 disposed directly adjacent and coaxial with connecting apertures 44. Thus, depending on the particular application of the ball nut, various fixturing members are inserted into trunion holes 58 up to the connecting apertures 44. This connection affords a fixture for translating the linear motion of the ball nut to various applications required.

As illustrated in FIG. 2, a dog stop 60 is disposed on top surface 24 of ball nut body 12 adjacent semi-cylindrical surface 22. Dog stop 60 is utilized as a positive stop for ball nut body 12.

The ball nut body 12 of the present invention thus combines the high strength and friction reducing characteristics of a stainless steel metal sleeve segment with the particularly lightweight characteristics of a polymeric ball nut body. Use of a precipitation hardening alloy provides further advantages due to its high strength-weight ratio and strength at elevated temperatures.

The accuracy of the ball nut of the present invention is maintained with regard to radial and axial backlash because the stainless steel liner, in conjunction with the ball screw can be machined to close tolerances. This accuracy, in conjunction with considerable weight reduction compared to all steel unitary ball nuts, makes the ball nut body of the present invention particularly useful in aircraft and defense missile applications.

In addition to the ball nut of the present invention, applicant discloses the method of manufacturing the ball nut of the present invention for use with a ball screw assembly. The preferred method of manufacturing the ball nut utilizes conventional plastic injection molding processes. Conventional injection molding commonly requires use of granular or powdered polymeric materials which are fed into a container for preheating the material to a melting temperature range. The melted polymeric material is then transported from the container to a barrel, commonly by a screw, and then injected through a nozzle into a mold. The polymeric material solidifies into the shape of the mold cavities. The press is then opened after the polymeric material is sufficiently cooled and the parts are then ejected.

The method of manufacturing a ball nut in the present invention includes the following steps. First, a sleeve segment 40 having a longitudinal opening 42 extending along one side and a longitudinal internal cavity is located on a fixturing post 66 extending out from a first injection mold portion 68, as shown in FIG. 3. The locating step comprises inserting a portion of the fixturing post 66 within the longitudinal internal cavity of the sleeve segment 40 and simultaneously cooperatively engaging the locating notch 70 disposed on the fixturing post within the longitudinal opening of the sleeve segment. Next, the sleeve segment is slid entirely onto the fixturing the post.

A second injection mold portion is next pressed onto the first injection mold portion to form a sealed mold cavity which corresponds to the shape of the ball nut of the present invention. The thermosetting polymeric material is injected into the seal mold cavity around the first sleeve segment and completely encases the first sleeve segment. The thermosetting polymeric material is subsequently cooled to form the ball nut body of the present invention. Lastly, the ball nut body is ejected from the first mold portion.

The deflector segment of the present invention can be molded independently of the ball nut body or can be molded simultaneously. The preferred method of manufacturing the ball nut body of the present invention includes molding a deflector segment simultaneously with the ball nut body further comprising the following steps. Providing a third mold portion in communication with the first mold portion wherein the third mold portion corresponds to the shape of the deflector segment of the present invention. A second mold portion is pressed onto the first and third mold portions to form a first mold cavity and a second mold cavity. Next a thermoplastic material is injected into both the first mold cavity and second mold cavity. The thermoplastic is then cooled to form a ball nut body and a deflector segment. The ball nut body is ejected from the first mold portion and the deflector segment is next ejected from the third mold portion.

Depending upon the intricacy of the third mold portion, the S-shaped return grooves of the deflector segment can be molded directly onto the deflector segment or machined in later. As discussed previously, a removable locating notch system is used to provide cooperating arcuate grooves within the ball nut body.

The above description constitutes the best mode contemplated at the time of filing by the inventor for carrying out the present invention. It will be apparent to those skilled in the art that many variations and modifications may be made therefrom without departing from the spirit of the present invention. Such variations and modifications are within the intended scope of the claims.

What is claimed is:

1. A ball nut for use in combination with a ball screw having a helical groove and a plurality of ball bearings comprising:

a partially circumambient sleeve segment having a longitudinal opening along one side thereof and a first surface portion, said first surface portion having a plurality of equidistant arcuate grooves defined thereon;

a partially circumambient deflector segment having a second surface portion cooperable with said first surface portion for completing the circumambience of said sleeve segment, said second surface portion having a plurality of S-shaped return grooves defined thereon spaced apart sufficiently to cooperate with both said plurality of arcuate grooves and said helical groove for completing a plurality of bearing race circuits inside said sleeve segment, whereby said S-shaped return grooves return ball bearings circulating within said bearing race circuits to a preceding segment of an arcuate groove; and a ball nut body encasing said sleeve segment and including a longitudinal slot for subsequently receiving said deflector segment sufficiently therein to place said plurality of equidistant arcuate grooves into cooperating relationship with said S-shaped return grooves.

2. A ball nut as in claim 1 wherein said deflector segment is retained within said ball nut body by loading said bearing race circuits with said plurality of ball bearings.

3. A ball nut as in claim 1 wherein said ball nut body further includes a substantially planar outer surface, a semi-cylindrical outer surface, a top surface and a bottom surface.

4. A ball nut as in claim 3 further including an arcuately sloping positive stop disposed on said top surface adjacent said semi-cylindrical outer surface.

5. A ball nut as in claim 1 wherein said sleeve segment is metallic and both said deflector segment and said ball nut body are plastic.

6. A ball nut as in claim 1 wherein said ball nut body is a fiber reinforced plastic and said sleeve segment is steel.

7. A ball nut as in claim 1 wherein said ball nut body is comprised of 45–50% nylon, 10–20% polytetrafluoroethylene, and 25–30% fiber reinforcement.

8. A ball nut as in claim 1 wherein said deflector segment is comprised of 45–50% nylon, 10–20% polytetrafluoroethylene, and 25–30% fiber reinforcement.

9. A ball nut as in claim 7 wherein said deflector segment is comprised of 60–70% nylon, 10–16% polytetrafluoroethylene, 1–4% silicone, and 25–30% fiber reinforcement.

10. A ball nut as in claim 7 wherein said fiber reinforcement is carbon fiber.

11. A ball nut as in claim 6 wherein said sleeve segment portion is a precipitation hardening stainless steel.

12. A ball nut as in claim 1 wherein said deflector segment S-shaped return grooves each include an intermediate transfer channel having a central depth sufficient to allow said plurality of ball bearings to disengage with said helical groove on said ball screw and travel substantially within said transfer groove.

13. A ball nut as in claim 12 wherein each of said intermediate transfer channels has a first edge and a second edge and the distance across said intermediate transfer channel from said first edge to said second edge is 3% to 8% greater than the diameter of each of said ball bearings.

14. A ball screw assembly comprising:

a ball screw having a helical groove;

a plurality of ball bearings, each having a diameter cooperable with said helical groove wherein said ball bearings travel within said helical groove;

a partially circumambient sleeve segment having a longitudinal opening along one side thereof and a first surface portion, said first surface portion having a plurality of equidistant arcuate grooves defined thereon;

a partially circumambient deflector segment having a second surface portion cooperable with said first surface portion for completing the circumambience of said sleeve segment, said second surface portion having a plurality of S-shaped return grooves defined thereon spaced apart sufficiently to cooperate with both said plurality of arcuate grooves and said helical groove for completing a plurality of bearing race circuits inside said sleeve segment, whereby said S-shaped return grooves return ball bearings circulating within said bearing race circuits to a preceding segment of an arcuate groove; and a ball nut body encasing said sleeve segment and including a longitudinal slot for subsequently receiving said deflector segment sufficiently therein to place said plurality of equidistant arcuate grooves into cooperating relationship with said S-shaped return grooves.

* * * * *